US008164584B2

(12) United States Patent
Lin

(10) Patent No.: US 8,164,584 B2
(45) Date of Patent: Apr. 24, 2012

(54) TOUCH PEN AND PORTABLE ELECTRONIC DEVICE USING THE SAME

(75) Inventor: Yi-Pang Lin, Tu-Cheng (TW)

(73) Assignee: Chi Mei Communication Systems, Inc., Tu-Cheng, New Taipei (TW)

( * ) Notice: Subject to any disclaimer, the term of this patent is extended or adjusted under 35 U.S.C. 154(b) by 419 days.

(21) Appl. No.: 12/486,885

(22) Filed: Jun. 18, 2009

(65) Prior Publication Data

US 2010/0123688 A1    May 20, 2010

(30) Foreign Application Priority Data

Nov. 19, 2008   (CN) .......................... 2008 1 0305637

(51) Int. Cl.
*G06F 3/033* (2006.01)
*B43K 1/10* (2006.01)

(52) U.S. Cl. ...................... 345/179; 178/19.01; 401/258

(58) Field of Classification Search .......... 345/173–183; 178/19.01–19.07; 401/258–260; D14/342, D14/411; 361/679.55, 679.56; 455/575.1
See application file for complete search history.

(56) References Cited

U.S. PATENT DOCUMENTS

| 4,580,919 | A | * | 4/1986 | Ambasz ......................... 401/117 |
| 7,136,052 | B1 | * | 11/2006 | Lam ............................... 345/179 |
| 7,425,948 | B2 | * | 9/2008 | Ling et al. ..................... 345/179 |
| 7,961,150 | B2 | * | 6/2011 | Kyou et al. ................... 343/702 |

* cited by examiner

*Primary Examiner* — Bipin Shalwala
*Assistant Examiner* — Steven Holton
(74) *Attorney, Agent, or Firm* — Altis Law Group, Inc.

(57) ABSTRACT

A portable electronic device includes a touch pen comprising a main body, a first pen head, a first elastic member, and a first sleeve. The first elastic member interconnects the main body and the first pen head. The first sleeve is slidably sleeved on the main body or the first elastic member so as to expose at least a part of the first elastic member. The first elastic member is bendable.

17 Claims, 6 Drawing Sheets

TOUCH PEN AND PORTABLE ELECTRONIC DEVICE USING THE SAME

BACKGROUND

1. Technical Field

The present disclosure relates to touch pens, and particularly, to a touch pen used in portable electronic devices.

2. Description of the Related Art

With the development of wireless communication and information processing technologies, portable electronic devices, such as mobile phones and personal digital assistants (PDAs), are now in widespread use.

In one such portable electronic device, a touch pen can be used to press at a specific locations on a transparent touch control panel to generate a control signal corresponding to the specific location. The touch pen is received in the portable electronic device. However, because the portable electronic device may be relatively thin and small, the touch pen also needs to be thin and small to be received in the portable electronic device making it uncomfortable for users to use.

What is needed, therefore, is a new touch pen and a portable electronic device using the same to overcome the above-described shortcomings.

BRIEF DESCRIPTION OF THE DRAWINGS

Many aspects of the present touch pen and a portable electronic device using the same can be better understood with reference to the following drawings. The components in the drawings are not necessarily drawn to scale, the emphasis instead being placed upon clearly illustrating the principles of the present touch pen and a portable electronic device using the same. Moreover, in the drawings, like reference numerals designate corresponding parts throughout the several views.

DETAILED DESCRIPTION

Figure 1:
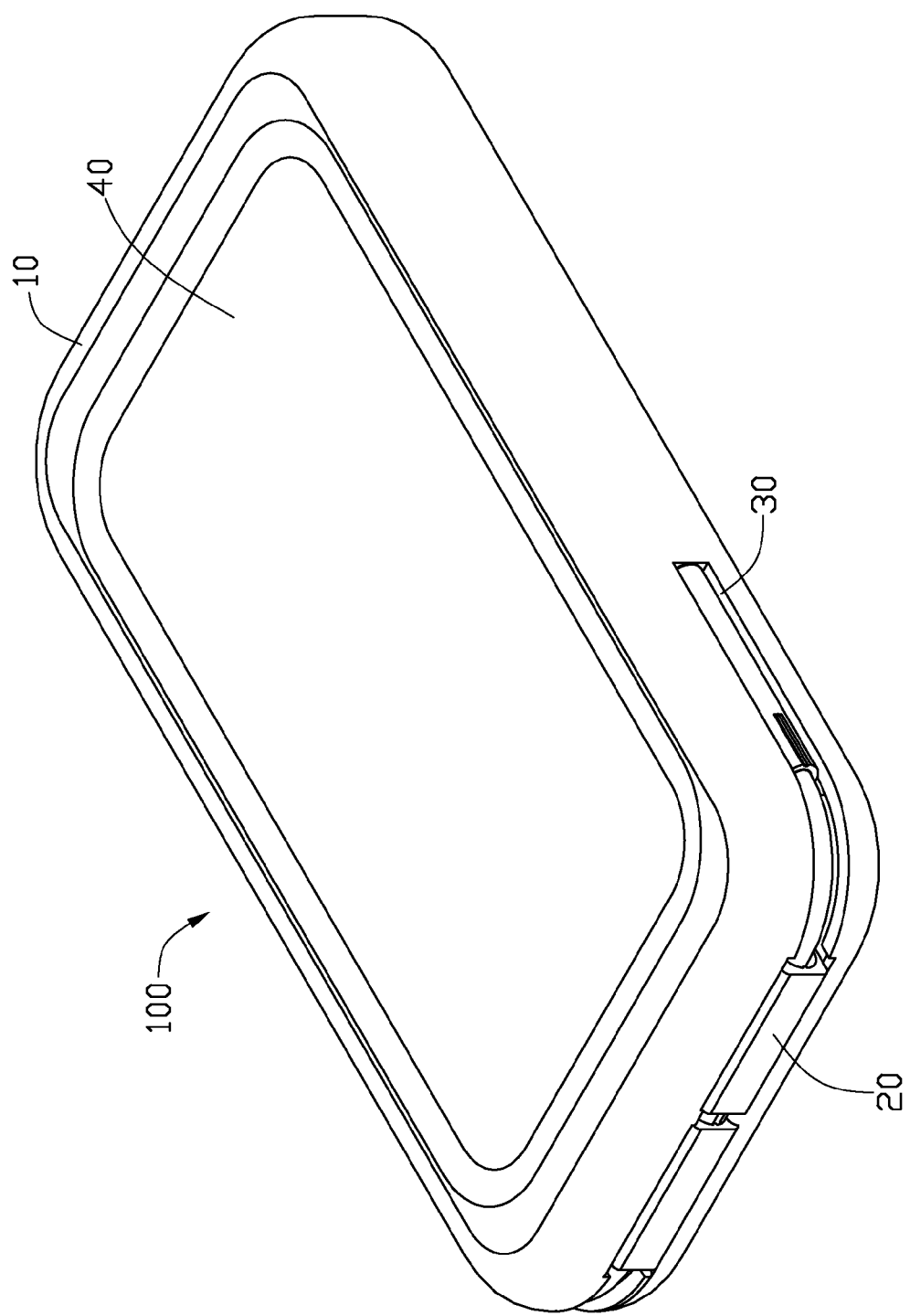
FIG. 1 is an isometric view of an embodiment of a touch pen assembled in a portable electronic device.
Figure 2:
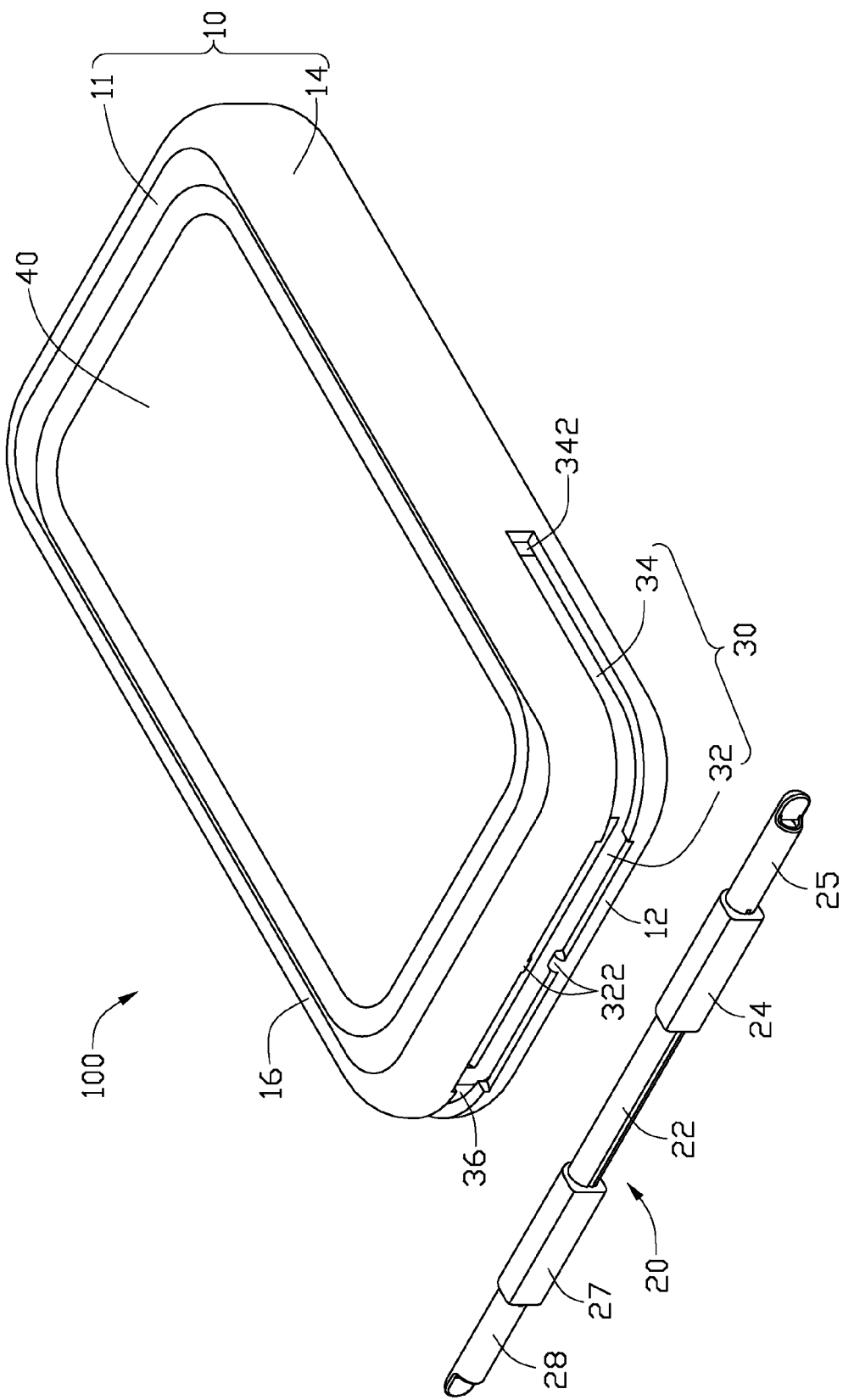
FIG. 2 is similar to FIG. 1, but the touch pen is disassembled from the portable electronic device.
Figure 3:
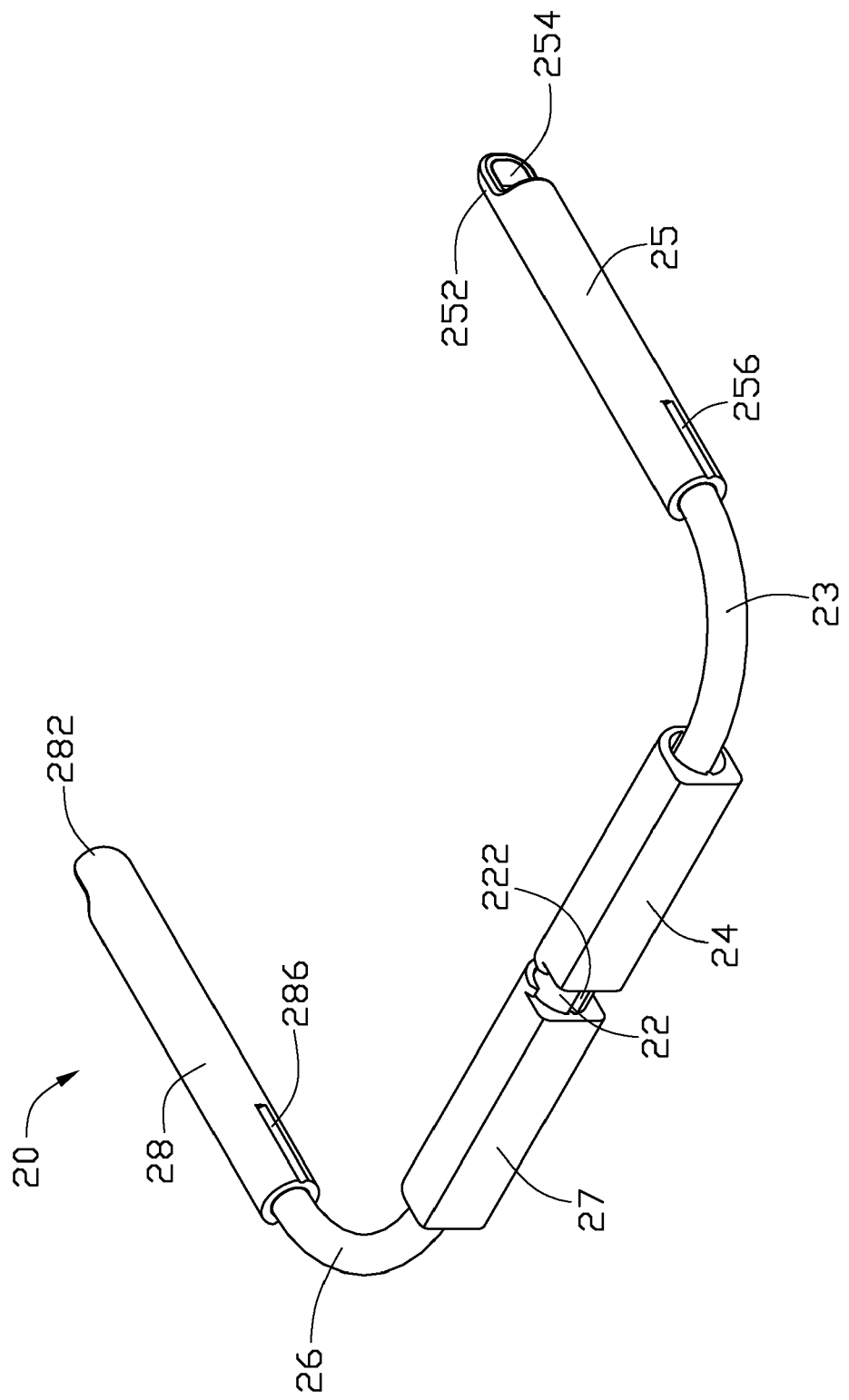
FIG. 3 is an enlarged, isometric view of the bendable touch pen of FIG. 2.
Figure 4:
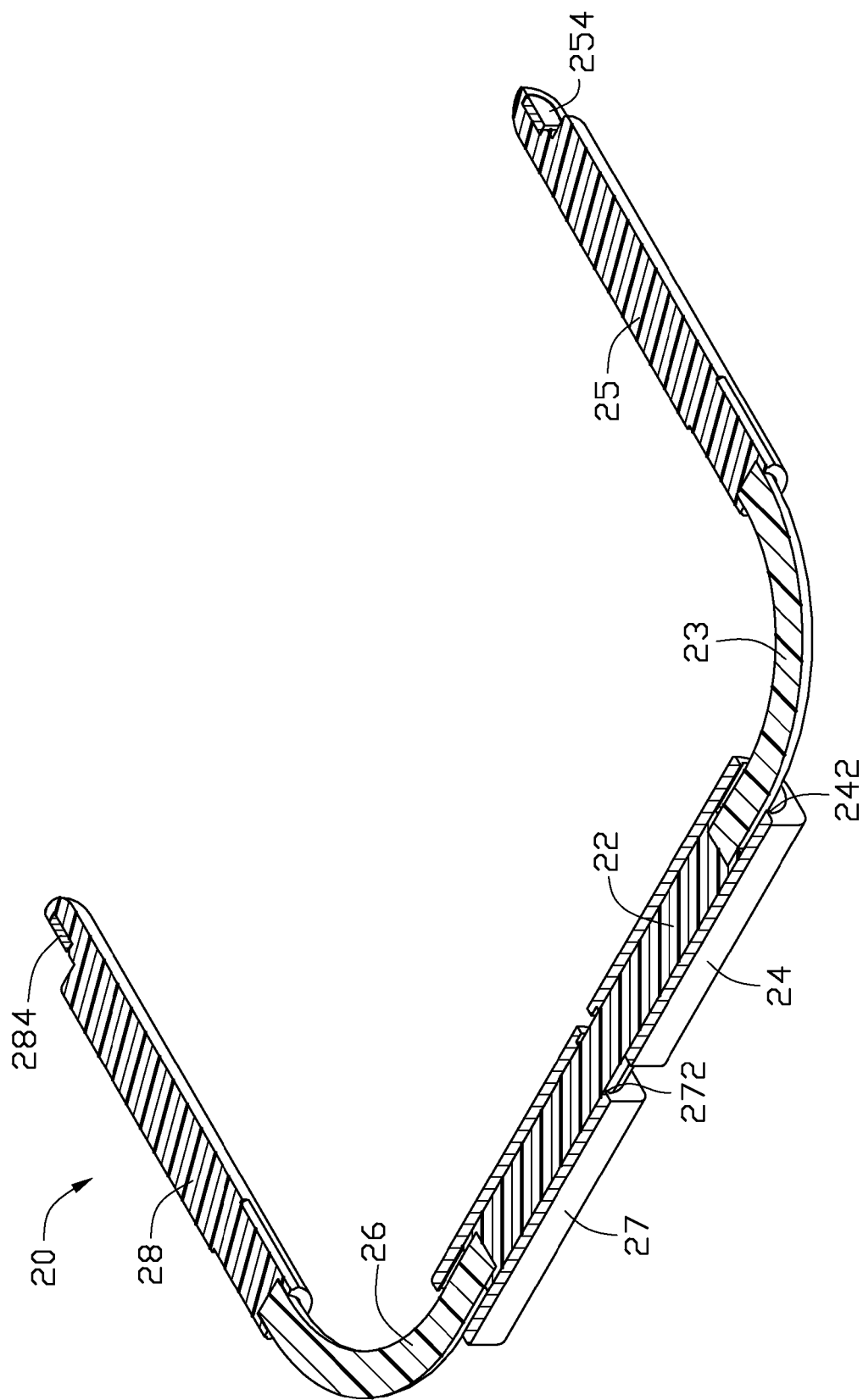
FIG. 4 is a cut-away view of FIG. 3.
Figure 5:
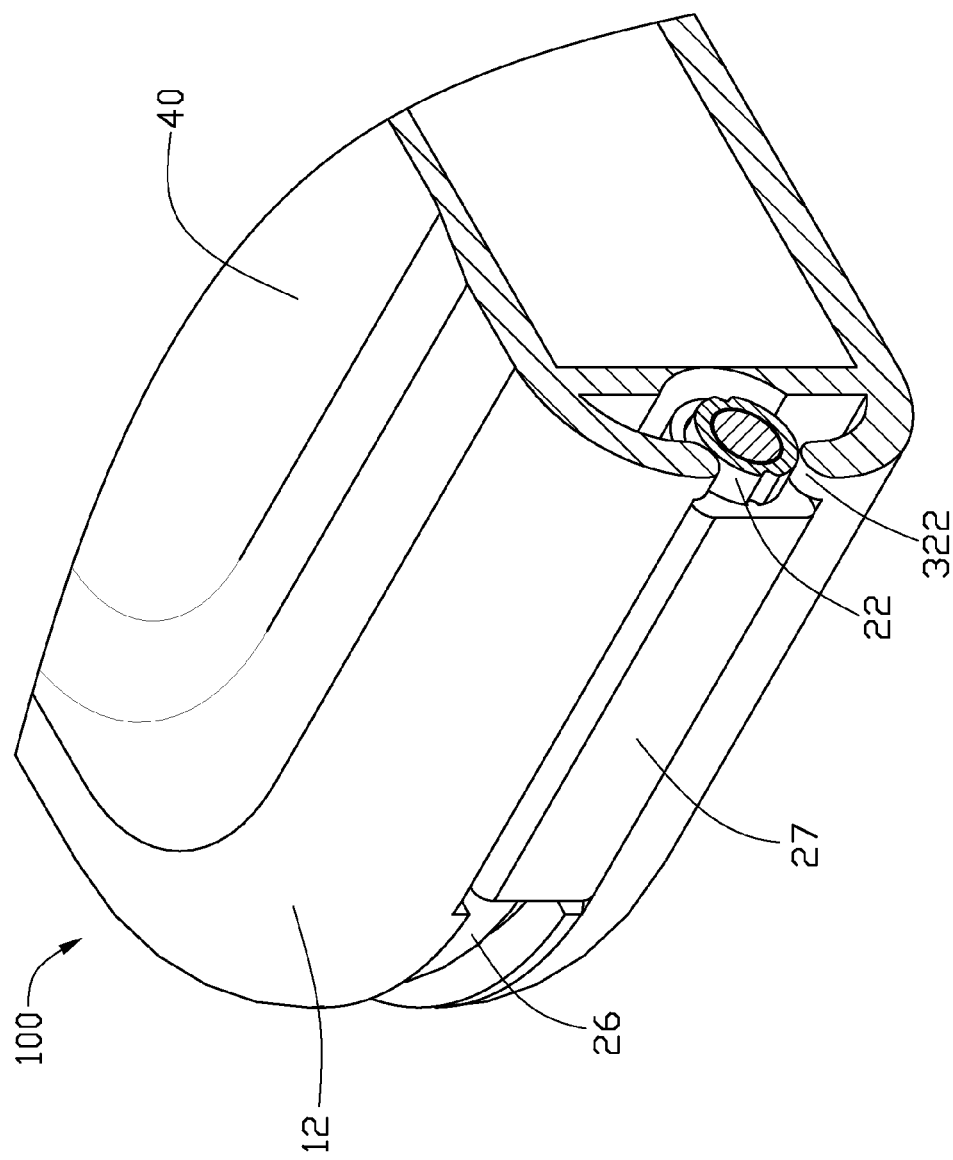
FIG. 5 is a partial, enlarged, cut-away view of the touch pen and the portable electronic device of FIG. 1.

Referring to FIG. 1, an embodiment of a portable electronic device 100 includes a housing 10, a touch pen 20, and a touch control panel 40. The portable electronic device 100 may be a mobile phone or a personal digital assistant (PDA), for example. In the illustrated embodiment, the portable electronic device 100 is a mobile phone.

Referring to FIGS. 2 through 5, the housing 10 includes an upper surface 11, a first side surface 12, a second side surface 14 and a third side surface 16. The second side surface 14 is opposite to the third side surface 16. The first side surface 12 interconnects one end of the second and third side surfaces 14, 16. The housing 10 includes a receiving groove 30 defined in the first side surface 12, and two ends of the receiving groove 30 extend through at least a part of the second and third side surfaces 14, 16. The touch pen 20 is held in the receiving groove 30 of the housing 10. The touch control panel 40 is positioned on the upper surface 11. In this embodiment, a length of the first side surface 12 is smaller than that of the second and third side surfaces 14, 16.

The touch pen 20 includes a main body 22, a first elastic member 23, a second elastic member 26, a first pen head 25, and a second pen head 28. The first pen head 25 and the second pen head 28 are located at two opposite ends of the touch pen 20. The first elastic member 23 interconnects the main body 22 and the first pen head 25. Similarly, the second elastic member 26 interconnects the main body 22 and the second pen head 28. The first and second pen heads 25, 28 are adapted to touch the touch control panel to execute one or more instructions for the portable electronic device 100. The touch pen 20 further includes a first sleeve 24 and a second sleeve 27. The first sleeve 24 is slidably sleeved on the main body 22 and the first elastic member 23. Similarly, the second sleeve 27 is slidably sleeved on the main body 22 and the second elastic member 26.

In the illustrated embodiment, the main body 22 is substantially columnar-shaped. The main body 22 includes a sliding depression 222 (see FIG. 3) extending along a direction parallel to an axis of the main body 22. The first elastic member 23 is columnar shape. The first elastic member 23 is made of an elastic material that bendable, and can easily resume its original shape. The second elastic member 26 is the same as the first elastic member 23. In one example, the first and second elastic members are made of rubber.

The first and second sleeves 24, 27 are all made of metallic materials, in one exemplary embodiment. The first sleeve 24 defines a first elongated protrusion 242 extending outwardly from an inner surface of the first sleeve 24. The first elongated protrusion 242 is slidably received in the sliding depression 222 of the main body 22. The second sleeve 27 is similar to first sleeve 24, the second sleeve 27 defining a second elongated protrusion 272 extending outwardly from an inner surface of the second sleeve 27.

The first pen head 25 includes a touch tip portion 252, a magnet member 254 and a first latching portion 256. The touch tip portion 252 is substantially hemi-columnar shaped, and the magnet member 254 is fixed to a side surface of the touch tip portion 252. In this embodiment, the first latching portion 256 is a latching slot defined at an end of the first pen head 25 opposite to the touch tip portion 252. Similarly, the second pen head 28 is similar to the first pen head 25, where the second pen head 28 also includes a touch tip portion 282, a magnet member 284 and a second latching portion 286. The second latching portion 286 is also a latching slot.

Referring to FIG. 2 again, the receiving groove 30 of the housing 10 includes a first groove 32, a second groove 34, and a third groove 36. The second groove 34, the first groove 32, and the third groove 36 communicate with each other. The first groove 32 is defined in the first side surface 12 to receive the main body 22, and the first and second sleeves 24, 27 of the touch pen 20. The second groove 34 is defined in the second side surface 14 to receive the first pen head 25 and the first elastic member 23 of the touch pen 20. The third groove 36 is defined in the third side surface 16 to receive the second pen head 28 and the second elastic member 26. The housing 10 further includes two opposite elastic latching hooks 322 extending from two opposite side surfaces of the first groove 32 of the receiving groove 30. The housing 10 further includes two metal sheets 342 disposed at a bottom surface of an end of the second and the third grooves 34, 36 away from the first groove 32, respectively.

The touch pen 20 can be bent to be received in the portable electronic device 100. Firstly, the first sleeve 24 is slid to sleeve on the main body 22 to expose a part of the first elastic member 23, and the second sleeve 27 is slid to sleeve on the main body 22 to expose a part of the second elastic member 26. Secondly, the main body 22, the first sleeve 24, and the second sleeve 27 are assembled into the first groove 32. The two opposite elastic latching hooks 322 resist against the main member 22 so as to hold the main member 22 in place. Finally, the first elastic member 23 is bent, and then the first pen head 25 is inserted into the second groove 34. The magnet member 254 of the first pen head 25 is attracted to fix with the metal sheet 342 in the second groove 34. Likewise, the second elastic member 26 is bent, and then the second pen head 28 is inserted into the third groove 36. The magnet member 284 of the second pen head 28 is attracted to fix with the metal sheet 342 in the third groove 36.

Figure 6:
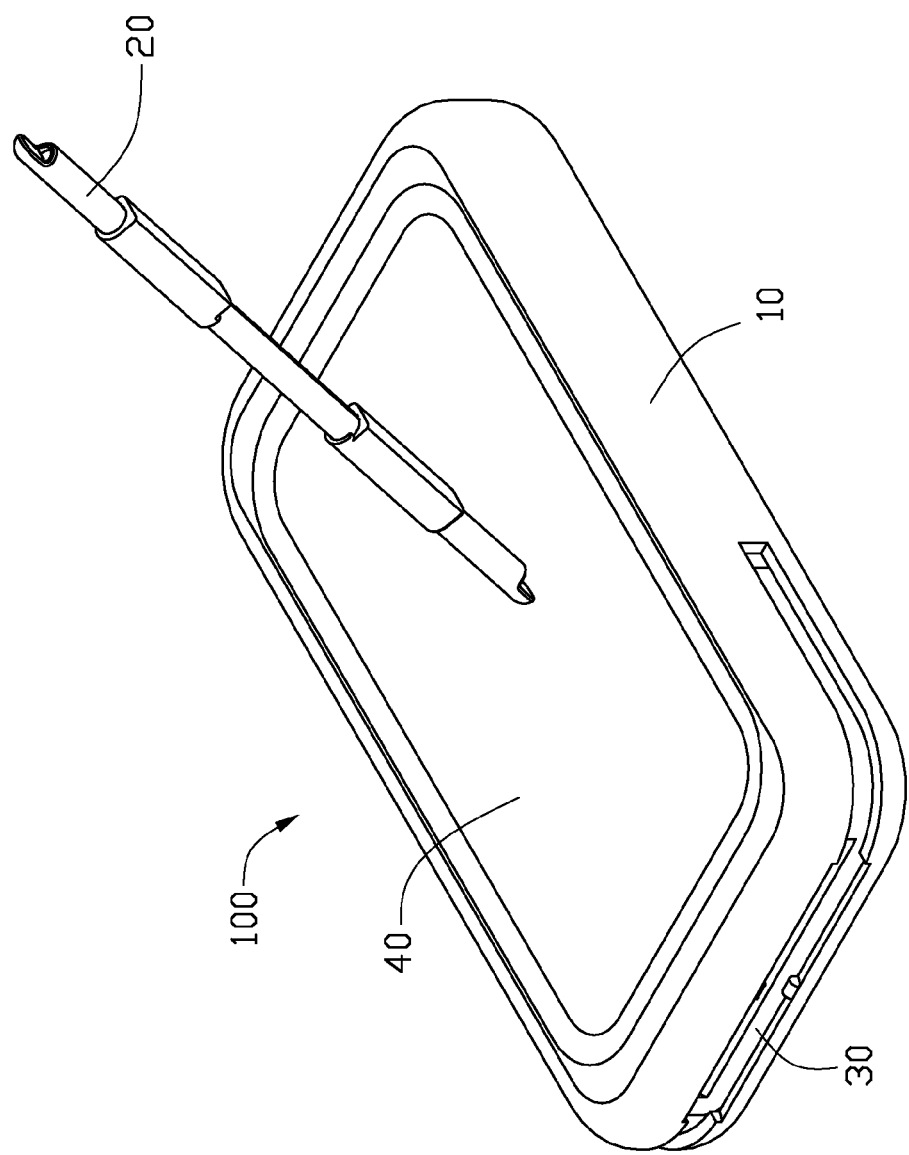
FIG. 6 is an isometric view of the touch pen of FIG. 1 used with the portable electronic device.

Referring to FIGS. 2 and 6 again, in use, the first elongated protrusion 242 of the first sleeve 24 is slid to be fixed in the first latching portion 256 of the first pen head 25, such that the first sleeve 24 interconnects the first pen head 25 and the main body 22 tightly, and the first sleeve 24 sleeves on the first elastic member 23. Likewise, the second elongated protrusion 272 of the second sleeve 27 is slid to be fixed in the second latching portion 286 of the second pen head 28, such that the second sleeve 27 interconnects the second pen head 28 and the main body 22 tightly, and the second sleeve 27 sleeves on the second elastic member 26. The touch pen 20 can be received in the portable electronic device I 00 in a bendable state, and has a relative longer length in use. Thus, it is comfortable for the user to use the touch pen 20.

In an alternative embodiment, it is to be understood that the first and second elongated protrusions 242, 272 of the first and second sleeves 24, 27 and the sliding depression 222 of the main body 22 can be replaced. Simultaneity, the first latching portion 256 and the second latching portion 286 can be elongated latching protrusions to match with the depression structures (like sliding depression 222) of first and second sleeves 24, 27.

It should be pointed out that the magnet members 254, 284, and the metal sheets 342 can be omitted, as long as the first and second pen heads 25, 28 are received in the second and third grooves 34, 36 respectively.

It should be pointed out that the touch pen 20 can have only one pen head, one elastic member, one sleeve.

Finally, while the present disclosure has been described with reference to particular embodiments, the description is illustrative of the disclosure and is not to be construed as limiting the disclosure. Therefore, various modifications can be made to the embodiments by those of ordinary skill in the art without departing from the true spirit and scope of the disclosure as defined by the appended claims.

What is claimed is:

1. A touch pen, comprising:
a main body;
a first pen head;
a first elastic member interconnecting the main body and the first pen head; and
a first sleeve;
wherein the first sleeve is slid to sleeve the first elastic member and be latched with the first pen head in a first position; the first sleeve is slid to sleeve the main body so as to expose at least a part of the first elastic member in a second position, wherein the first elastic member is bendable.

2. The touch pen of claim 1, wherein the main body comprises a sliding depression extending along a direction parallel to an axis thereof; the first sleeve comprising a first elongated protrusion extending from an inner surface thereof, the first elongated protrusion being slidably received in the sliding depression in the second position for latching the first sleeve to the main body.

3. The touch pen of claim 2, wherein the first pen head comprises a touch tip portion and a first latching slot defined at an end of the first pen head opposite to the touch tip portion thereof; the first elongated protrusion of the first sleeve is slid to be fixed in the first latching slot of the first pen head to latch the first sleeve to the first pen head.

4. The touch pen of claim 1, further comprising a second pen head, a second elastic member and a second sleeve, the second elastic member interconnecting other end of the main body and the second pen head, the second sleeve is slid to sleeve the second elastic member and be latched with the second pen head in a first position; the second sleeve is slid to sleeve the main body so as to expose at least a part of the second elastic member in a second position.

5. The touch pen of claim 4, wherein the main body comprises a sliding depression extending along a direction parallel to an axis thereof;
the second sleeve comprising a second elongated protrusion extending from an inner surface thereof, the second elongated protrusion being slidably received in the sliding depression in the second position for latching the second sleeve to the main body.

6. The touch pen of claim 5, wherein the second pen head comprises a touch tip portion and a second latching slot defined at an end of the second pen head opposite to the touch tip portion thereof; the second elongated protrusion of the second sleeve is slid to be fixed in the second latching slot of the second pen head to latch the second sleeve to the second pen head.

7. The touch pen of claim 4, wherein the first and second elastic members are made of rubber.

8. A portable electronic device, comprising:
a housing including a first side surface, a second side surface and a third side surface opposite to the second side surface, the first side surface interconnecting one end of the second and third side surfaces; the housing further comprising a first groove, a second groove, and a third groove; the first groove, the second groove, and the third groove being communicated in that order; the first groove being defined in the first side surface, the second groove is defined in the second side surface, the third groove is defined in the third side surface; and
a touch pen assembled in the housing, the touch pen comprising: a main body, a first pen head, a second pen head, a second elastic member and a second sleeve, a first elastic member interconnecting one end of the main body and the first pen head, the second elastic member interconnecting another end of the main body and the second pen head, a first sleeve slidably sleeved on the main body and the first elastic member so as to expose at least a part of the first elastic member, the second sleeve slidably sleeved on the main body and the second elastic member so as to expose at least a part of the second elastic member, wherein the first elastic member and the second elastic member are bendable, the first groove receives the main body, and the first and second sleeves of the touch pen; the second groove receives the first pen head and the first elastic member; the third groove receives the second pen head and the second elastic member.

9. The portable electronic device of claim 8, wherein the main body comprises a sliding depression extending along a direction parallel to an axis thereof; the first sleeve comprising a first elongated protrusion extending from an inner surface thereof, the first elongated protrusion being slidably received in the sliding depression.

10. The portable electronic device of claim 9, wherein the first pen head comprises a touch tip portion and a first latching slot defined at an end of the first pen head opposite to the touch tip portion thereof; the first elongated protrusion of the first sleeve capable of being slid to be fixed in the first latching slot of the first pen head to interconnect the first pen head and the main body tightly.

11. The touch pen of claim 8, wherein the main body comprises a sliding depression extending along a direction parallel to an axis thereof; the second sleeve comprising a second elongated protrusion extending from an inner surface thereof, the second elongated protrusion being slidably received in the sliding depression.

12. The portable electronic device of claim 11, wherein the second pen head comprises a touch tip portion and a second latching slot defined at an end of the second pen head opposite to the touch tip portion thereof; the second elongated protrusion of the second sleeve capable of being slid to be fixed in the second latching slot of the second pen head to interconnect the second pen head and the main body tightly.

13. The portable electronic device of claim 8, wherein the housing further comprises two opposite elastic latching hooks extending from two opposite side surfaces of the first groove, the two opposite elastic latching hooks resist the main body so as to hold the main member in place.

14. The portable electronic device of claim 10, wherein the housing further comprises two metal sheets disposed at a bottom surface of an end of the second and the third grooves away from the first groove respectively, wherein each of the first and second pen heads further comprises a magnet member fixed to a side surface of the touch tip portion; the magnet members of the first and second pen heads being attracted to fix with the metal sheets of the housing.

15. A portable electronic device, comprising:
a housing including a first groove, a second groove, and a third groove; the first groove, the second groove, and the third groove being communicated in that order; and
a touch pen comprising a main body, a first pen head, a second pen head, a second elastic member and a second sleeve, a first elastic member interconnecting one end of the main body and the first pen head, the second elastic member interconnecting another end of the main body and the second pen head, a first sleeve sleeved on the first elastic member and latched with the first pen head, the second sleeve sleeved on the second elastic member and latched with the second pen head;
wherein the first sleeve and the second sleeve are slid to be latched with the main body so as to expose at least a part of the first elastic member and the second elastic member, wherein the main body, the first and second sleeves are received in the first groove, the first elastic member and the second elastic member are bendable to be received in the second groove and the third groove, the first pen head is received in the second groove, and the second pen head is received in the third groove.

16. The portable electronic device of claim 15, wherein the main body comprises a sliding depression extending along a direction parallel to an axis thereof; the first sleeve comprising a first elongated protrusion extending from an inner surface thereof, the first pen head comprises a touch tip portion and a first latching slot defined at an end of the first pen head opposite to the touch tip portion thereof, and the first elongated protrusion is selectively latched in the sliding depression and the first latching slot.

17. The portable electronic device of claim 16, wherein the second sleeve comprising a second elongated protrusion extending from an inner surface thereof, the second pen head comprises a touch tip portion and a second latching slot defined at an end of the second pen head opposite to the touch tip portion thereof, and the second elongated protrusion is selectively latched in the sliding depression and the second latching slot.

* * * * *